Figure 1:
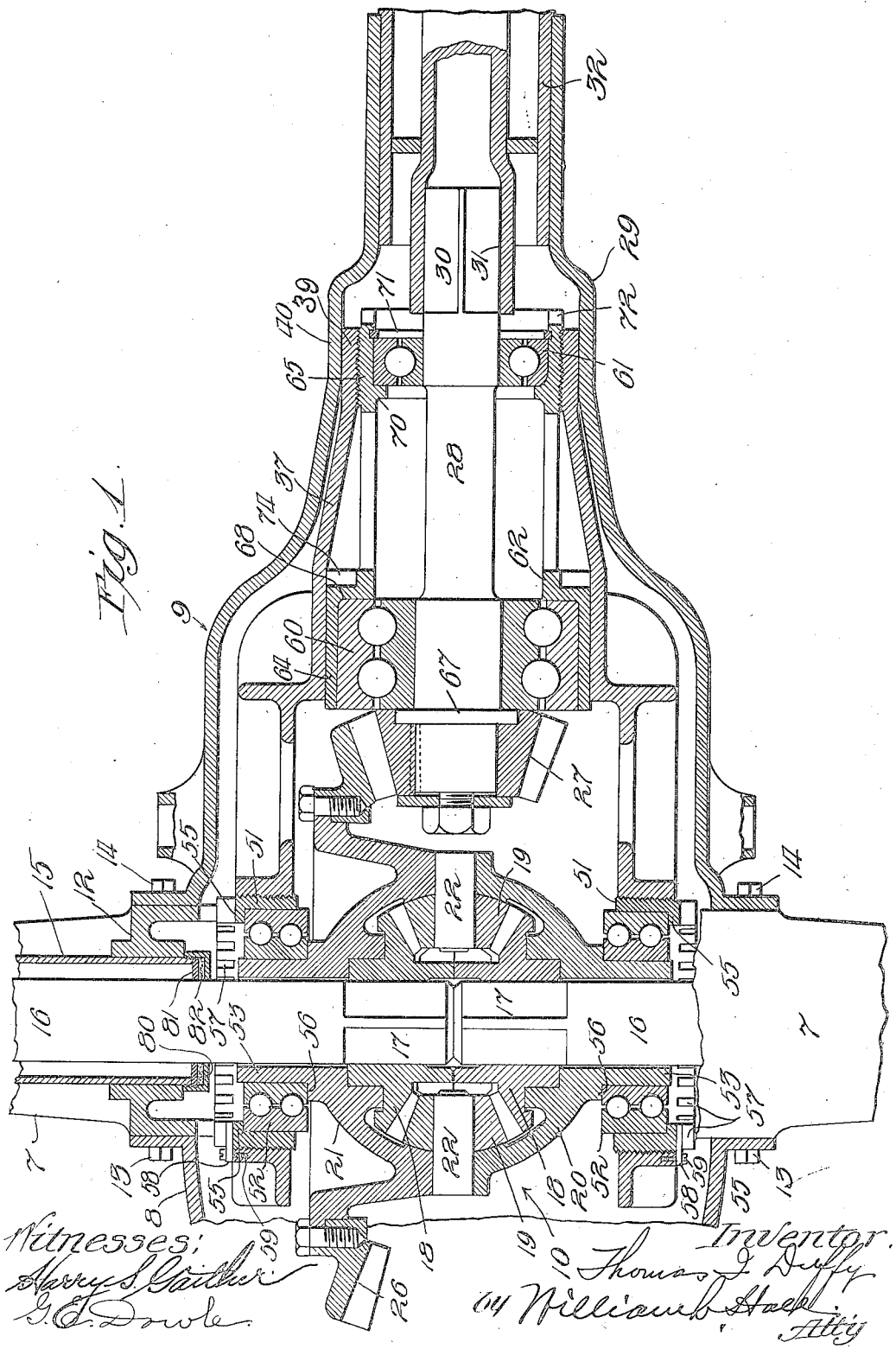

T. I. DUFFY.
GEARING.
APPLICATION FILED JUNE 5, 1912.

1,076,560.

Patented Oct. 21, 1913.

3 SHEETS—SHEET 1.

Witnesses:
Harry S. Gaither
G. E. Dowle

Inventor.
Thomas I. Duffy
William B. Hall
Atty

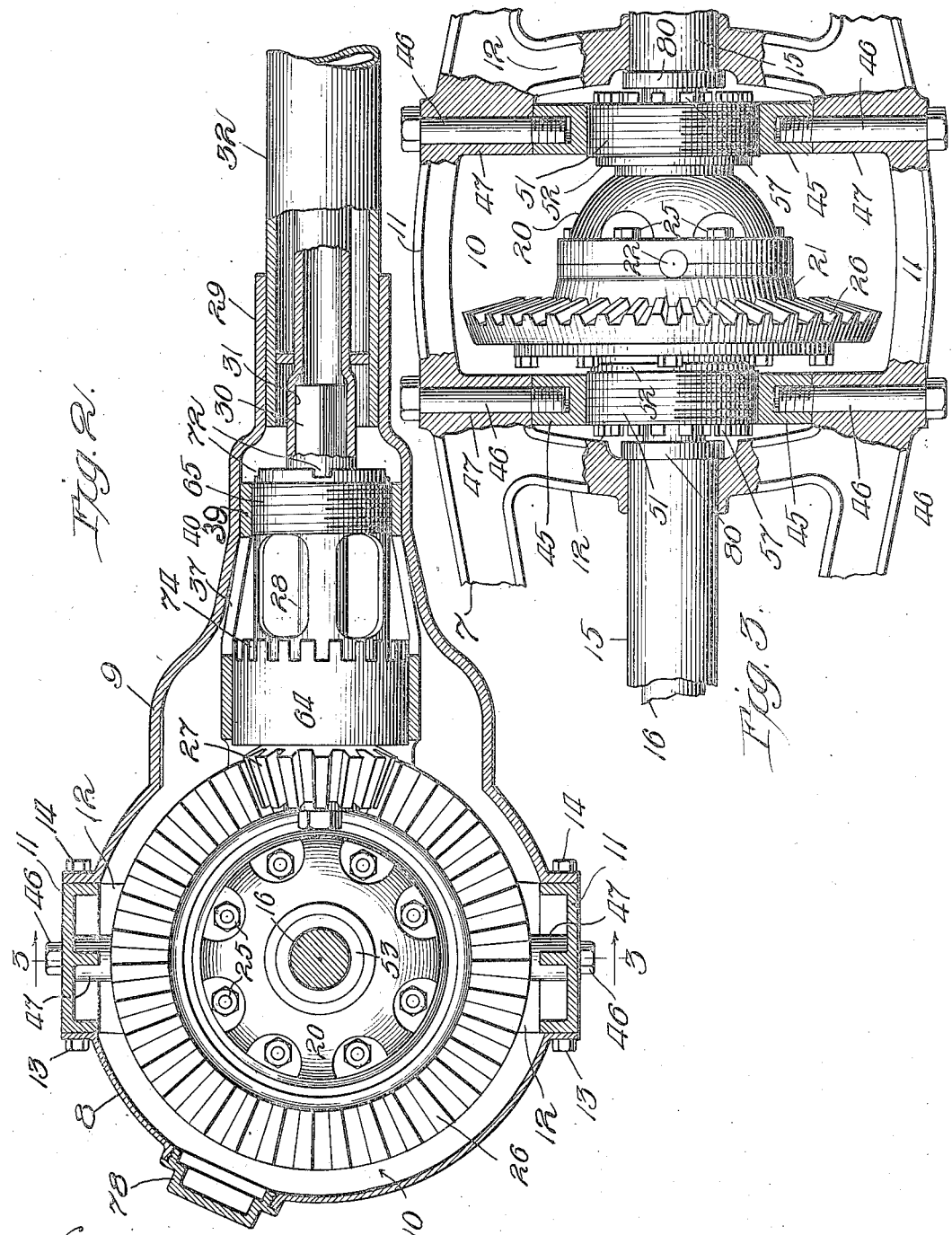

T. I. DUFFY.
GEARING.
APPLICATION FILED JUNE 5, 1912.
1,076,560.
Patented Oct. 21, 1913.
3 SHEETS—SHEET 3.
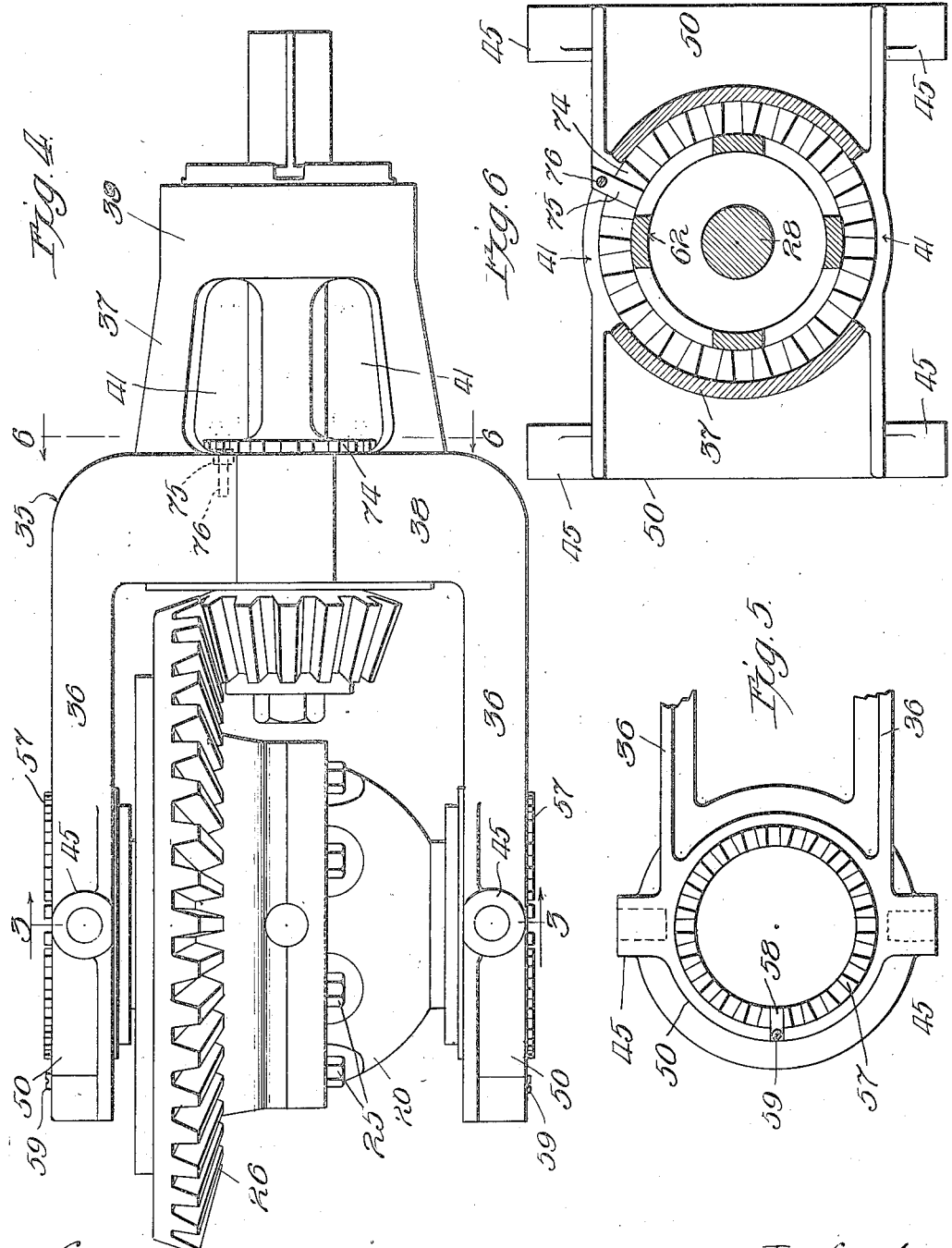

UNITED STATES PATENT OFFICE.

THOMAS I. DUFFY, OF CHICAGO, ILLINOIS, ASSIGNOR TO HENRY ELLSWORTH AND ALBERT E. CROSS, BOTH OF CHICAGO, ILLINOIS, COPARTNERS DOING BUSINESS UNDER THE FIRM-NAME OF ELLSWORTH & CROSS.

GEARING.

1,076,560.            Specification of Letters Patent.      Patented Oct. 21, 1913.

Application filed June 5, 1912. Serial No. 701,723.

*To all whom it may concern:*

Be it known that I, THOMAS I. DUFFY, a citizen of the United States, and a resident of Chicago, in the county of Cook and State of Illinois, have invented certain new and useful Improvements in Gearing; and I do hereby declare that the following is a full, clear, and exact description thereof, reference being had to the accompanying drawings, and to the characters of reference marked thereon, which form a part of this specification.

This invention relates to improvements in gearing and refers more particularly to an improved construction and arrangement for mounting a differential gear in the rear or drive axle of motor vehicles, so constructed and arranged as to permit the differential gear and its mounting to be removed as a unit from the chambered portion of the axle which receives the same.

Among the objects of the invention is to provide an arrangement of the differential gear and mounting therefor which permits the gearing to be removed from and inserted into the axle without disturbing any of the bearing thereof, and which, at the same time, enables the elements of the gearing to be adjusted with respect to each other with the said elements in full view, so as to thereby secure accurate adjustment of the gear elements.

A further object of the invention is to provide a gear mounting of this character in which the frame which carries the bearings for the gear elements, while being of open work construction to permit the gears to be observed when removed from the axle and to permit a lubricant to reach all movable parts of the gearing and bearings therefor, is rigidly secured together through the intermediary of the axle casing which receives the gear so as to hold the bearings in fixed relation to each other and the gear elements in accurate adjustment.

A further object of the invention is to provide an improved means for adjusting the elements of the gear toward and from each other, so arranged as to permit a fine and accurate adjustment of the gear elements toward and from each other, with means for locking the parts in adjusted position, by the use of relatively coarse screw threads and locking devices.

Other objects of the invention are to improve and simplify gearing and gear mounting for this and like uses, and the invention consists in the combination and arrangement of the parts hereinafter described and more particularly pointed out in the appended claims.

In the drawings:—Figure 1 is a horizontal section of a differential gear and mounting therefor taken in the general plane of the axis of the driving axle. Fig. 2 is a vertical section thereof taken in a plane transverse to the axis of the axle. Fig. 3 is a partial section and partial elevation, the section being indicated on the line 3—3 of Fig. 2. Fig. 4 is a plan view of the removable and insertible unit, comprising the differential gear, its frame and bearings. Fig. 5 is a partial side view thereof. Fig. 6 is a cross section of the line 6—6 of Fig. 4.

As shown in the drawings, 7 designates the rear axle of a motor vehicle, which, as herein shown, is made like the axle shown in my co-pending application for U. S. Letters Patent filed of even date herewith, Serial Number 701,722. The said axle is constructed in connection with a cap piece 8, attached to the rear side of the axle, and a forwardly extending casing 9, attached to the front of the axle, to constitute a chamber 10 to receive and inclose the differential gear and its mounting separately shown in Fig. 4; the intermediate portion of said chamber being inclosed by the upper and lower truss members 11, 11 and the struts 12, 12 formed integral with the truss members. The said cap piece 8 and casing 9 are secured to the axle by bolts 13, 14 respectively, which extend through marginal flanges of the cap piece and shell and into the axle body. The said axle embraces in its construction tubular members 15 which inclose the driving shafts 16 of the axle, when made of the full floating type as herein shown; the inner ends of said shafts 16 being squared at 17 to fit into squared openings of the beveled gear wheels 18, 18 of the differential gear, said shafts 16 being engaged with and disengaged from the beveled gear wheels 18 by axial movement of the shafts, in a familiar manner. The said beveled gear wheels 18 and the pinions 19 which mesh therewith are inclosed in a shell or frame which comprises the two parts 20, 21 that are joined in the plane of the shafts 22 of the pinions 19 and are fastened together by the screw bolts 25, as more clearly shown in Figs. 3 and 4. The shell member 21 carries a large gear wheel 26 that meshes with a pinion 27 which is fixed to the shaft 28 that is mounted in a forward extension 29 of the casing 9. The shaft 28 is squared at its forward end 30 to engage the rear socketed end of the propeller shaft 31 that is contained within the usual torque tube 32 that fits within the forward reduced end or neck portion of the casing 9. These features of construction may be made in any suitable or preferred manner and constitute separately no part of the present invention.

35 designates as a whole (Fig. 4) a yoke shaped frame having at its rear end the arms 36, 36 and at its forward end a reduced or neck portion 37 which is made integral with the transverse member 38 of the yoke. Said neck portion is made cylindric at its forward end as shown at 39 to closely fit within the cylindric portion 40 of the reduced end of the casing 9. The said neck portion 37 of the gear yoke frame is open work or skeleton construction to permit oil to pass from the axle chamber through the neck portion to the bearings within the same, it being shown in Figs. 4 and 6 as provided with opposing openings 41.

The arms 36 of the yoke shaped frame are provided near their rear ends and at their upper and lower sides with socketed screw-threaded lugs 45 which receive fastening screw bolts 46, 46, that extend upwardly and downwardly through openings in thickened portions 47 of the truss members 11 at their junctions with the struts 12, whereby said frame is rigidly fixed to the axle structure when in place on the chambered portion of the axle. The axle structure thus constitutes a means of rigidly connecting the free ends of the yoke arms, to thereby maintain the bearings carried by the yoke arms in fixed relation with respect to each other. This construction is of considerable importance inasmuch as it leaves the rear end of the gearing frame open so as to permit the gear elements to be readily assembled in the frame and be dismounted therefrom, while at the same time affording as rigid a connection between the ends of the yoke arms as though said yoke arms were connected by an integral connecting piece.

The rear ends of the yoke arms are enlarged to form hubs 50, the openings of which are axially alined in the axis of the shafts 16. These hubs are interiorly screw threaded to receive exteriorly screw-threaded solid rings 51 which receive and retain in place suitable anti-friction bearings 52 for the tubular bearing extensions 53, 53 of the members 20, 21 of the gear shell or frame. These bearings may be of any suitable type, and as herein shown comprise inner and outer rings formed with raceways to receive between them anti-friction balls.

The rings 51 are provided near their outer ends with internal shoulders or flanges 55, between which and external annular shoulders 56 of the shell members 20, 21 the raceway rings of the bearings are confined. The said rings 51 are formed on their outer ends to provide an annular series of lugs 57 and interposed recesses. The recessed outer ends of the rings 51 constitute means for engagement therewith of a suitable tool, whereby the rings may be turned into and out of the openings in the hubs, and whereby the bearings and the gear shell may be adjusted so as to bring the gear wheel 26 carried by the shell into proper meshing adjustment with the pinion 27. The said rings are adapted to be locked in adjusted position by means of a key 58 arranged to project into one of the recesses between the locking lugs 57 and to be fixed to the adjacent yoke arm in any suitable manner, as by means of the screws 59 extending through an opening in the outer end of the key and into the yoke arm. It will be observed that the said locking lugs are formed on a circle of large radius, thereby permitting minute adjustments of the parts with the use of relatively large, and therefore strong, locking lugs, and also with the use of fairly large screw-threads.

With the construction described, the differential gear, after the unit has been withdrawn from the axle chamber, may be readily disassembled by parting the gear shell by the removal of the bolts 25 and thereafter backing the rings 51 out of the hubs of the fork arms. When this is done the shell member 20 is free to drop sufficiently to permit the withdrawal of the pinions 19, after which the shell member 21 and gear wheel 26 may be swung downwardly to free its tubular bearing extension 53 from the adjacent yoke arm and the parts withdrawn rearwardly away from the yoke. Thereafter the shell member 20 is free to be released from the yoke member.

An advantage of this construction is that the bearings for the gear shell may be mounted in solid rings 51 thereby insuring, by the locking means described, or other equivalent means, maintenance of accurate adjustment of the parts, and also an exceedingly strong and durable bearing.

The bearings 60, 61 for the shaft 28 are mounted in a cage 62 that is insertible into and removable from the reduced neck portion 37. Said cage comprises a cylindrical rear end portion 64 that fits tightly with a sliding engagement in an opening in the transverse member of the yoke, and a reduced, front cylindric, exteriorly screw-threaded portion 65 which engages an interior screw-thread at the extreme end of the neck portion of the yoke shaped frame. Said bearings may be of any suitable type, and as herein shown, they comprise inner and outer race-way rings with interposed bearing balls. The inner bearing 60 is confined between a collar 67 on the shaft 28 and an interior shoulder 68 of the cage between the larger rear end and reduced front portion thereof. The outer bearing 61 is interposed between an internal shoulder or flange 70 of the cage and a retaining ring 71 that is confined in a groove within the cage at the front end thereof. Said front end of the cage is extended beyond the neck 37 of the frame yoke and is provided with spanner notches 72 adapted to be engaged by a suitable tool, whereby the cage and the shaft 28 may be adjusted to carry the pinion 27 into proper meshing engagement with the gear wheel 26, and whereby, also the cage may be turned out of the neck portion 37.

The cage is provided at its shoulder between the larger and smaller diameter thereof with a circular series of external lugs 74 and intervening recesses, which are adapted to be engaged by a locking key 75, shown best in Figs. 4 and 6, arranged to enter one of the recesses between adjacent lugs 74. Said key may be attached, as by means of screws 76, to the yoke frame. The said locking lugs 74, are formed on a circle of large radius, as will appear from an inspection of Fig. 6, so that I am thereby enabled to secure a minute adjustment of the pinion 27 to the gear wheel 26 by the use of large, and therefore strong, locking lugs, and by the use of relatively large screw-threads between the cage and the neck portion 37.

It will be observed that the reduced extension 40 of the casing 9 is sufficiently larger than the yoke frame gear mounting so that oil within the axle chamber may find its way freely through the open or skeleton neck 37 and the open cage 62 to the bearings for the shaft 28. The said axle chamber, composed in part of the cap plate 8 and casing 9, is adapted to be fitted to the axle proper and to the torque tube to constitute an oil tight chamber which is filled with oil, and in which the differential gear runs. The cap plate is provided with an opening that is closed by a plug 78 through which oil to the chamber may be replenished. Oil tight joints are formed at the inner ends of the tubular axle sections 15 around the shaft sections 16 by extending said axle sections inwardly beyond the struts 12, as shown in Figs. 1, 3 and 4, and screw-threading the inner end of said tube sections, to receive the oil caps 80. Between said oil caps and hard washers 81 which bear against the ends of the axle tube sections are interposed felt or other soft washers 82 which are clamped between the washers 81 and caps 80 so as to be forced tightly upon the shaft sections 16 within the oil chamber.

When the differential gear and its mounting are to be removed as a unit, the cap 8 and the screws 46 are removed, after which the shaft sections 16 are drawn endwise away from the differential gear. The said differential gear and its mounting may then be withdrawn as a whole rearwardly through the rear opening of the axle chamber. When so withdrawn all of the adjustments for the gear elements are free for access, and the parts to be adjusted are in sight, so as to thereby facilitate the adjustment of the gear elements.

It is to be understood that many of the structural details shown are capable of variation within the spirit and scope of the invention and the invention is not limited to such details except as hereinafter made the subject of specific claims.

I claim as my invention;—

1. The combination with a chambered axle, of a differential gear and its mounting frame and bearings adapted to be inserted into and removed from the chamber as a unit, said frame being open to permit access to the gear elements.

2. The combination with a chambered axle, of a differential gear, its open, one-piece frame and bearings adapted to be inserted into and removed from the axle chamber as a unit, said one piece frame being provided with opposed screw-threaded openings, solid rings screw-threaded in said openings and bearings in said rings for the shell of the differential gear.

3. The combination with a chambered axle, of a differential gear, its frame and bearings adapted to be inserted into and removed from the axle chamber as a unit, said frame comprising laterally opposing members integral with each other to support the bearings for the shell of said gear, and bearings for said shell carried by said members and adjustable toward and from each other.

4. The combination with a chambered axle, of a differential gear, its frame and bearings adapted to be inserted into and removed from the axle chamber as a unit, said frame comprising laterally opposing members integral with each other to support the bearings for the shell of said gear, bearings for said shell carried by said members and adjustable toward and from each other and means for fixedly attaching said opposing lateral members of the frame to the chambered axle to rigidly hold said members in fixed relation.

5. The combination with a chambered axle, of a differential gear, its frame and bearings adapted to be inserted into and removed from the axle chamber as a unit, said frame embracing a yoke shaped member the arms of which are integral with each other and provided in its arms with axially alined bearings for said gear.

6. The combination with a chambered axle, of a differential gear, its frame member and bearings adapted to be inserted into and removed from the axle chamber as a unit, said frame member embracing a yoke shaped part the arms of which are integral with each other and provided in its arms with axially alined bearings for the shell of said gear, and means for fixedly and detachably attaching the arms of the yoke member to the walls of the chamber.

7. The combination with a chambered axle, of a differential gear, its integral frame, and bearings carried by the frame, all adapted to be inserted into and removed from the axle chamber as a unit, said frame being open to permit access to the gear elements, and provided with opposed screw-threaded openings, and rings seated in parts of the frame integral with each other and carrying the bearings for the shell of the differential gear, and provided at their outer ends with means for engagement by a tool, whereby the rings may be adjusted toward and from each other.

8. The combination with a chambered axle, of a differential gear, its integral frame, and bearings carried by the frame, all adapted to be inserted into and removed from the axle chamber as a unit, said frame being open to permit access to the gear elements and provided in integral parts of the frame with opposed screw-threaded openings, rings seated therein and carrying the bearings for the shell of the differential gear, and provided at their outer ends with means for engagement by a tool whereby the rings may be adjusted toward and from each other, and means carried by the frame and engaging said rings to lock the rings in adjusted positions.

9. The combination with a chambered axle, of a differential gear and its integral frame adapted to be inserted into and removed from the axle chamber as a unit, said frame being provided in integral parts thereof with opposed openings, rings seated therein, and adjustably fixed to the frame, bearings in said rings for the shell of the differential gear provided at their outer ends with notches for engagement with a tool, and locking keys engaging said notches and having means to attach them to said gear frame.

10. The combination with an axle having a casing provided with a rear opening and with a removable cover therefor, said casing terminating forwardly of the axle in a reduced tubular portion, of a differential gear and its frame adapted to be inserted into and removed from said casing as a unit, said frame being of open construction to expose the gear and provided with opposing bearings for the shell of the gear and with a forwardly extending, tubular neck portion of open construction that is fitted in the reduced portion of the casing, a drive pinion and its shaft and bearings for said shaft carried by said neck portion.

11. The combination with an axle having a casing provided with a rear opening and with a removable cover therefor, said casing terminating forwardly of the axle in a reduced tubular portion, of a differential gear and its frame adapted to be inserted into and removed from said casing as a unit, said frame being of open construction to expose the gear and provided with opposing bearings for the shell of the gear and with a forwardly extending, tubular neck portion of open construction that is fitted in the reduced portion of the casing, a drive pinion and its shaft, bearings for said shaft carried by said neck portion, and a cage of open construction for said shaft bearings mounted in said neck portion.

12. The combination with an axle having a casing provided with a rear opening and with a removable cover therefor, said casing terminating forwardly of the axle in a reduced tubular portion, of a differential gear and its frame adapted to be inserted into and removed from said casing as a unit, said frame being of open construction to expose the gear elements and provided with opposing bearings for the shell of the gear and with a forwardly extending, tubular neck portion of open construction that is fitted into the reduced portion of the casing, a drive pinion and its shaft, bearings for said shaft carried by said neck portion and means whereby said cage may be adjusted forwardly and rearwardly and locked in adjusted position.

13. The combination with an axle having a casing provided with a rear opening and with a removable cover therefor, said casing terminating forwardly of the axle in a reduced tubular portion, of a differential gear and its frame adapted to be inserted into and removed from the casing as a unit, said frame being of open construction to expose the gear elements and provided with opposing bearings for the shell of the gear and with a forwardly extending, tubular neck portion of open construction that is fitted in the reduced portion of the casing, a drive pinion and its shaft, bearings for said shaft carried by said neck portion, a cage for said shaft bearings screw-threaded at its forward end to said neck portion and having sliding engagement at its rear end in an opening in said frame, whereby the cage the bearings and said shaft may be adjusted endwise relatively to said frame and means for locking the cage in adjusted position.

14. The combination with an axle having a casing provided with a rear opening and with a removable cover therefor, said casing terminating forwardly of the axle in a reduced tubular portion, of a differential gear and its frame adapted to be inserted into and removed from said casing as a unit, said frame being of open construction to expose the gear elements and provided with opposing bearings for the shell of the gear and with a forwardly extending, tubular neck portion of open construction that is fitted in the reduced portion of the casing, a drive pinion and its shaft, and bearings for the shaft carried by said neck portion, a cage for said shaft bearings screw-threaded at its forward end to said neck portion and having sliding engagement at its rear end in an opening in said frame, whereby the cage, the bearings, and said shaft may be adjusted endwise relatively to said frame, said cage being provided between its ends with a circular series of locking notches and a key adapted to be inserted in said notches and to be fixed to said frame.

15. The combination with an axle having a casing provided with a rear opening and with a removable cover therefor, said casing terminating forwardly of the axle in a reduced tubular portion, of a differential gear and its frame adapted to be inserted into and removed from the casing as a unit, said frame being of open construction to expose the gear elements and provided with opposed bearings for the shell of the gear and with a forwardly extending, tubular portion of open construction that is fitted in the reduced portion of the casing, a drive pinion and its shaft, bearings for said shaft carried by said neck portion, a cage of open construction for said shaft bearings mounted in said neck portion, said cage, shaft and bearings being removable as a unit from the neck portion of said casing.

16. The combination with an axle having a casing provided with a rear opening and with a removable cover therefor, said casing terminating forwardly of the axle in a reduced tubular portion, of a differential gear and its frame adapted to be inserted into and removed from said casing as a unit, said differential gear embracing a gear wheel carried by the shell of the gear and a coöperating pinion and its shaft, opposing antifriction bearings carried by the frame for the gear shell, with exteriorly accessible means to adjust them toward and from each other and to lock them in adjustment, and bearings for the pinion shaft carried by a reduced neck portion of the frame and provided at its forward end with externally accessible means for adjusting the shaft bearings and said pinion toward and from said gear wheel and locking the parts in adjustment.

17. In differential gearing mounting the combination with a gear wheel and a pinion constituting part of said gearing of spaced bearings for said pinion, a cage in which said bearings are mounted, a fixed part to which said cage is screw-threaded, said cage being provided between its ends with a circular series of locking notches and a locking key adapted to enter said locking notches.

18. The combination with an axle provided with an oil tight casing for a differential gear, of a differential gear insertible into and withdrawable from said casing, the axle embracing tube sections which extend into said casing, drive shafts extending through the tube sections for connection with the differential gear, caps screw-threaded to the ends of the tube sections within the casing and washers surrounding said shafts and compressible between the caps and the ends of the said tube sections.

19. The combination with an axle provided with a chamber or housing to receive a differential gear and its mounting frame and provided with a rear opening through which said gear and its frame may be removed as a unit, a differential gear and mounting frame and bearings therefor within the housing, with means to fix the frame to the housing, and a removable cover, separate from said frame, to fit over and close said rear opening of the housing.

In testimony, that I claim the foregoing as my invention I affix my signature in the presence of two witnesses, this 27th day of May A. D. 1912.

THOMAS I. DUFFY.

Witnesses:
G. E. DOWLE,
W. L. HALL.